Patented July 10, 1951

2,559,684

UNITED STATES PATENT OFFICE 2,559,684

STABILIZING RED PHOSPHORUS

Sol Skolnik, Inyokern, Calif., and Grover L. Bridger, Ames, Iowa, assignors to Tennessee Valley Authority, a corporation of the United States No Drawing. Application April 27, 1949, Serial No. 90,035

3 Claims. (Cl. 23—223)

(Granted under the act of March 3, 1883, as amended April 30, 1928; 370 O. G. 757)

The invention herein described may be manufactured and used by or for the Government for governmental purposes without the payment to us of any royalty therefor.

This invention relates to improved methods for stabilizing red phosphorus against ignition caused by impact or friction, particularly effective in stabilizing freshly prepared red phosphorus against the hazards of impact or friction ordinarily encountered in handling or shipping the dry material.

Although red phosphorus is a relatively stable material as compared with yellow phosphorus, the handling and shipping of red phosphorus are attended by a number of hazards. Red phosphorus does not ignite spontaneously on exposure to air unless it contains appreciable traces of yellow phosphorus. Such traces of yellow phosphorus are frequently present in freshly manufactured red phosphorus. Even substantially pure red phosphorus can be easily ignited when it is handled in such manner that there is substantial impact on the mass of particles or considerable friction is imposed upon them. Such conditions are frequently encountered in the packaging and shipping of red phosphorus so that the danger of fire is always present.

It has long been known that red phosphorus slowly oxidizes in the air, and in the presence of moisture normally present in air, phosphoric acid is formed. This is shown by A. W. Mel'or's treatise on Inorganic and Theoretical Chemistry, vol. 8, 772 (1928). Upon such exposure to air with partial oxidation and formation of phosphoric acid, a mass of finely divided red phosphorus becomes moistened with hygroscopic acid and cakes into a mass which is difficult to handle.

So far as is known, there are no methods disclosed in the prior art for reducing the danger of ignition of red phosphorus under impact or friction. In fact, for most uses, it is desired that this material be sensitive to impact or friction. Prior efforts, therefore, have been directed to the stabilization of red phosphorus against slow surface oxidation without materially reducing the sensitivity of the material toward ignition under the influence of impact or friction. To this end it has been proposed to treat red phosphorus with a small amount of a lyophilic protein-containing colloid and to dry under conditions such that a thin film is deposited around the individual particles. Coating red phosphorus particles with aluminum hydrate by aeration of a slurry of red phosphorus in a soluble aluminate solution also has been proposed. Such coatings are ineffective for stabilizing red phosphorus against accidental ignition due to impact and friction.

It is highly desirable that some method be provided which will stabilize red phosphorus against accidental ignition under the influence of impact and friction, and which will leave red phosphorus powder in an apparently dry and free-flowing state. It is also desirable that any such method should leave no foreign substance in the red phosphorus which is not easily removable by simple washing with water. It is also desirable that a method be provided which not only reduces the danger of ignition of red phosphorus under impact or the influence of friction, but which also retards oxidation of traces of yellow phosphorus which are frequently present.

It is an object of this invention to provide a method for stabilizing finely divided red phosphorus against ignition under impact or the influence of friction and which will leave such red phosphorus powder in an apparently dry and free-flowing state.

Another object is to provide such method which will not result in the incorporation of any material in stabilized red phosphorus which is not easily removable by simple washing with water.

Another object is to provide an apparently dry, free-flowing red phosphorus powder stabilized against ignition under impact or the influence of friction.

Other objects and advantages will become apparent as this disclosure proceeds.

We have now found that finely divided red phosphorus normally susceptible to ignition under the influence of impact and friction may be stabilized by depositing a small quantity of a material selected from the group consisting of phosphorus pentoxide, phosphorus trioxide, highly concentrated phosphoric acid, highly concentrated phosphorous acid and mixtures thereof, as a coating upon the surfaces of the individual particles of such red phosphorus and maintaining the resulting coated red phosphorus in a condition of apparent dryness.

The above-mentioned oxides and acids of phosphorus may be deposited as a coating upon individual particles of red phosphorus in a number of different manners. When using a material selected from the group consisting of concentrated phosphoric and phosphorous acids, we prefer to incorporate the acid into the mass of red phosphorus powder in any manner which results in substantially even distribution of acid and dry the resulting coated phosphorus to a state of apparent dryness at a low temperature—preferably about 60° C. Ordinary concentrated phosphoric or phosphorous acid of commerce are used, and these acids become highly concentrated by such drying.

When an oxide of phosphorus is used, preferably phosphorus pentoxide, we prefer to pass the oxide in very finely divided form suspended in a gas through a bed of red phosphorus powder for a time sufficient to deposit the required coating on the surfaces of the individual particles of red phosphorus.

The amount of oxide or acid necessary to materially increase the stability of red phosphorus against ignition by impact and friction is small. As little as 1 to 3 per cent of such oxide or acid, calculated as $P_2O_5$, has been found to materially increase the resistance of red phosphorus to ignition by impact and friction. We prefer however to use a quantity between 5 and 7 per cent, calculated as $P_2O_5$, as this amount is sufficient to impart to the red phosphorus a high degree of stability without any change in its property of being free-flowing and noncaking. The addition of quantities of oxide or acid above 7 per cent adds very little to the stability of the phosphorus, and the addition of very large quantities detracts somewhat from the free-flowing quality of the phosphorus. Considerably more than 7 per cent, however, may be added without causing the material to cake; provided that very high concentration of acid is maintained. Substantially all uncombined water should be removed in the drying step mentioned above.

After coating the particles of phosphorus powder, it is necessary that they be maintained in a state of apparent dryness. The oxides or acids used are highly hygroscopic and tend to absorb moisture from the air, thereby causing the phosphorus to become sticky and to cake. One preferred method of maintaining such phosphorus in a state of apparent dryness is merely to pour the free-flowing powder into drums until the drums are substantially filled and then to close the openings thereof. Such phosphorus may be shipped in closed containers with little of the usual hazards encountered in shipping such material. When it is desired to remove the phosphorus from such containers, it may be poured out easily, conveniently, and quickly.

The following examples illustrate the degree of stabilization obtained by our method.

EXAMPLE I

A sample of finely divided red phosphorus was separated into several portions. These portions were treated as is indicated below. After treatment, the portions were tested for stability against impact according to a standard test which comprises dropping a 12-ounce ball from varying heights onto prepared pellets of red phosphorus and noting the number of pellets firing and failing to fire at each height. The average height for a given sample has been selected as the height at which one-half the pellets fired and one-half failed to fire.

1. This portion of sample was maintained free of oxides and acids.
2. Another portion of the above sample was treated with concentrated phosphoric acid and dried at 60° C. to apparent dryness. The proportion of phosphoric acid used was such that it was equivalent to 5 per cent $P_2O_5$ of the weight of the phosphorus.
3. Another portion of the above-mentioned sample of finely divided red phosphorus was treated with concentrated phosphorous acid in proportion equivalent of 13 per cent, calculated as $P_2O_5$, of the weight of the phosphorus. This material also was dried to apparent dryness at low temperature.
4. Another portion of the above sample was coated with phosphorus pentoxide in an extremely finely divided state, passed through a bed of the finely divided phosphorus until the per cent of $P_2O_5$ deposited thereon amounted to 6.7.
5. The portion of sample described in paragraph 4 above, after treatment with phosphorus pentoxide, was divided and one part was treated with lime in proportion sufficient to neutralize the phosphorus pentoxide.
6. A small sample of red phosphorus was prepared, containing no iron, copper, oxide, or acid.

Pellets were prepared from each of the above-treated samples and these pellets were tested in the impact machine described above. The ball was dropped from the maximum height of the machine—29 inches—successively onto 25 pellets prepared from each given portion, and the number of pellets that fired and failed to fire was noted. The procedure was repeated from lower heights at 2-inch intervals until none of the pellets fired. A graph was plotted with "fraction misfired" as abscissae and "height" as ordinates. The height at which the curve crossed the one-half misfired line was taken to be the average height. Results of these tests are given in the following table.

Table I

| Portion number | Treatment | Grams as $P_2O_5$ per gram red phosphorus | Average height, in. |
|---|---|---|---|
| 1 | Free of oxides and acids | 0 | 11.3 |
| 2 | Coated with concentrated phosphoric acid and dried. | 0.050 | 26.2 |
| 3 | Coated with concentrated phosphorous acid and dried. | 0.130 | 28.7 |
| 4 | Coated with phosphorus pentoxide. | 0.067 | 25.0 |
| 5 | Coated with phosphorus pentoxide + lime. | 0.067 | 14.3 |
| 6 | Free of oxides, acids, Fe and Cu | 0 | 11.5 |

From the above table it is apparent that the presence of a highly concentrated water-soluble acid or oxide of phosphorus as a coating on the particles of red phosphorus materially increases their stability against ignition by impact. The results obtained with portion 3 show that there is little increase in stability as the quantity of acid or oxide is increased above 7 per cent of the weight of the phosphorus. The result obtained with portion 5 indicates that when the oxide or acid is neutralized, as by lime, the impact stability is greatly reduced, thus indicating that the coating material must be present as an acid or oxide and not as a salt. The close correspondence of portions 1 and 6 indicates that the presence of small amounts of iron and copper in such red phosphorus does not materially increase its susceptibility to ignition by impact, although iron and copper are well known to be oxidation catalysts, strongly promoting the oxidation of phosphorus.

EXAMPLE II

A standard test for ignition of materials by friction has been developed by the United States Bureau of Mines. In this test a pendulum of variable weight and angular deflection is swung to strike and rub across a sample of material such as red phosphorus in powder form resting upon an anvil whose plane is substantially tangential to the arc in which the pendulum swings. The vertical height from which the pendulum falls and the weight of the pendulum are critical factors by which the stability of the sample toward ignition by friction is measured.

Samples of red phosphorus prepared as indicated in the following table and weighing approximately 0.02 gram were placed on the anvil of this apparatus and the pendulum, with a small weight added, was swung from a low height. Ten different samples were tested at each weight and height. If none of these samples ignited, first the weight of the pendulum and then the height of pendulum swing was increased. The height and weight at which one sample in ten ignited were used as the indication of frictional stability. The results of such friction tests on samples prepared by treating red phosphorus with acids and oxides of phosphorus, as described above, are given in the following table.

Table 2

| Treatment of sample | Grams $P_2O_5$ per gram red phosphorus | Pendulum height, cm. | Added weight on pendulum, g. |
| --- | --- | --- | --- |
| Free of oxides and acids | None | 45 | 5 |
| Phosphorous acid added and sample dried | 0.0124 | 59 | 500 |
| $P_2O_5$ added | 0.0204 | 50 | 500 |
| Phosphoric acid added and sample dried | 0.0564 | 50 | >1,000 |

The results show that the coating of oxide or acid on the particles of red phosphorus greatly increased the stability of these particles against ignition by friction.

Inspection of the data given in the above examples will show that we have prepared finely divided red phosphorus, stabilized against ignition under the influence of impact and friction, by a method which is very simple and inexpensive to apply. In addition, the coating which we use may be removed very simply and easily by washing with water. The highly concentrated acid or oxide forming our coating leaves such finely divided red phosphorus in a free-flowing and noncaking condition, so that it may be easily handled merely by pouring into containers and may easily be maintained in this condition by excluding the prepared phosphorus from free contact with the atmosphere.

We are unable to state with certainty the reason why such a coating should materially reduce the sensitivity of red phosphorus toward impact or friction. It is probable that ignition of red phosphorus under impact or friction is caused by localized high temperature, resulting when irregularly shaped particles are rubbed or crushed together. It is postulated that the coating of oxide or highly concentrated acid of phosphorus acts both as a lubricant permitting the particles to slide past each other smoothly without generation of sufficient heat to raise the temperature at any point within the mass of particles to the ignition point, and also to exclude oxygen from free contact with the surfaces of such particles. An increase in the quantity of coated material probably increases the degree of impact or friction which can be imposed without causing ignition, but this increase is not lineal and we prefer to use quantities in the range from 5 to 7 per cent of the weight of the phosphorus when calculated as phosphorus pentoxide.

It is possible to coat red phosphorus with oxides or acids of phosphorus by incorporating iron or copper into the phosphorus and exposing it to the atmosphere and drying the product. However, this method is very slow, requiring special storage facilities for carrying out the oxidation. We prefer to treat the red phosphorus with an oxide or highly concentrated acid of phosphorus as soon as it has been manufactured so that there will be no necessity for handling the material without a protective coating.

The terms "highly concentrated phosphoric acid" and "highly concentrated phosphorous acid" are used in this description and the subtended claims to mean acids containing substantially no uncombined water.

Having described our invention and explained its operation, we claim:

1. A process for stabilizing finely divided red phosphorus normally susceptible to ignition under the influence of impact and friction which comprises admixing such red phosphorus with a material selected from the group consisting of concentrated phosphoric and phosphorous acids; drying the resulting mixture at a low temperature until substantially all uncombined moisture is removed; and maintaining the resulting mixture, consisting of fine particles of red phosphorus having their surfaces coated with highly concentrated acid, in a state of apparent dryness.

2. A process for stabilizing finely divided red phosphorus normally susceptible to ignition under the influence of impact and friction which comprises admixing such red phosphorus with a small proportion of concentrated phosphoric acid; drying the resulting mixture at a low temperature until substantially all uncombined moisture is removed; and maintaining the resulting mixture, consisting of fine particles of red phosphorus having their surfaces coated with highly concentrated phosphoric acid, in a state of apparent dryness.

3. A process for stabilizing finely divided red phosphorus normally susceptible to ignition under the influence of impact and friction which comprises admixing such red phosphorus with a small proportion of concentrated phosphorous acid; drying the resulting mixture at a low temperature until substantially all uncombined moisture is removed; and maintaining the mixture, consisting of fine particles of red phosphorus having their surfaces coated with highly concentrated phosphorous acid, in a state of apparent dryness.

SOL SKOLNIK.
GROVER L. BRIDGER.

REFERENCES CITED

The following references are of record in the file of this patent:

UNITED STATES PATENTS

| Number | Name | Date |
| --- | --- | --- |
| 1,880,538 | Waggaman | Oct. 4, 1932 |
| 2,399,120 | Hurd | Apr. 23, 1946 |

OTHER REFERENCES

Mellor, "Inorganic and Theoretical Chemistry," vol. 8, pages 944–945. Longmans, Green & Co. N. Y., publishers.